(No Model.) 4 Sheets—Sheet 2.
C. L. JEFFERS.
ELECTRIC LIGHT HANGER.
No. 428,723. Patented May 27, 1890.
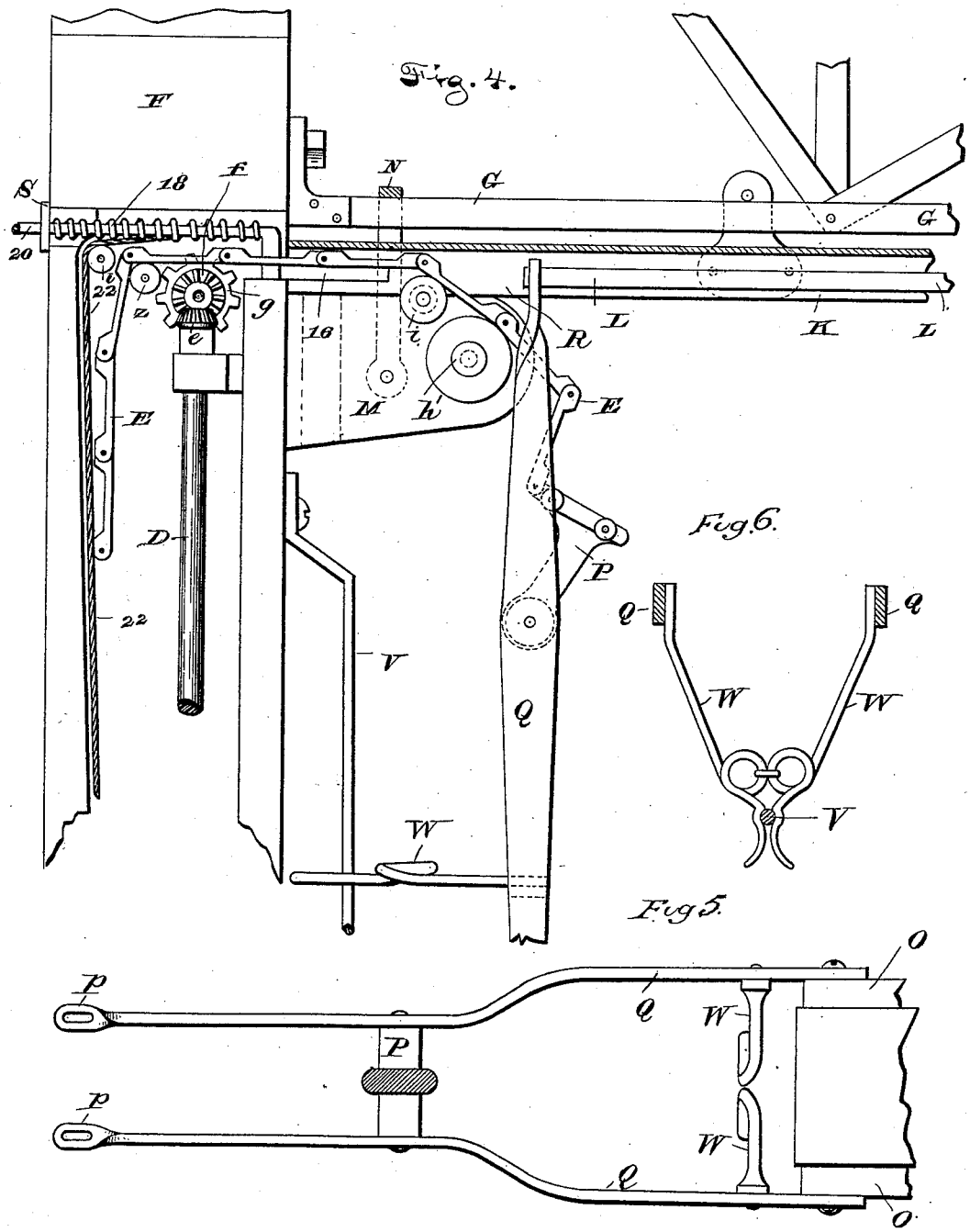
WITNESSES:
H. W. Nealy.
T. W. Fowler.
INVENTOR
Clarence L. Jeffers
BY
A. H. Evans & Co.
ATTORNEY.

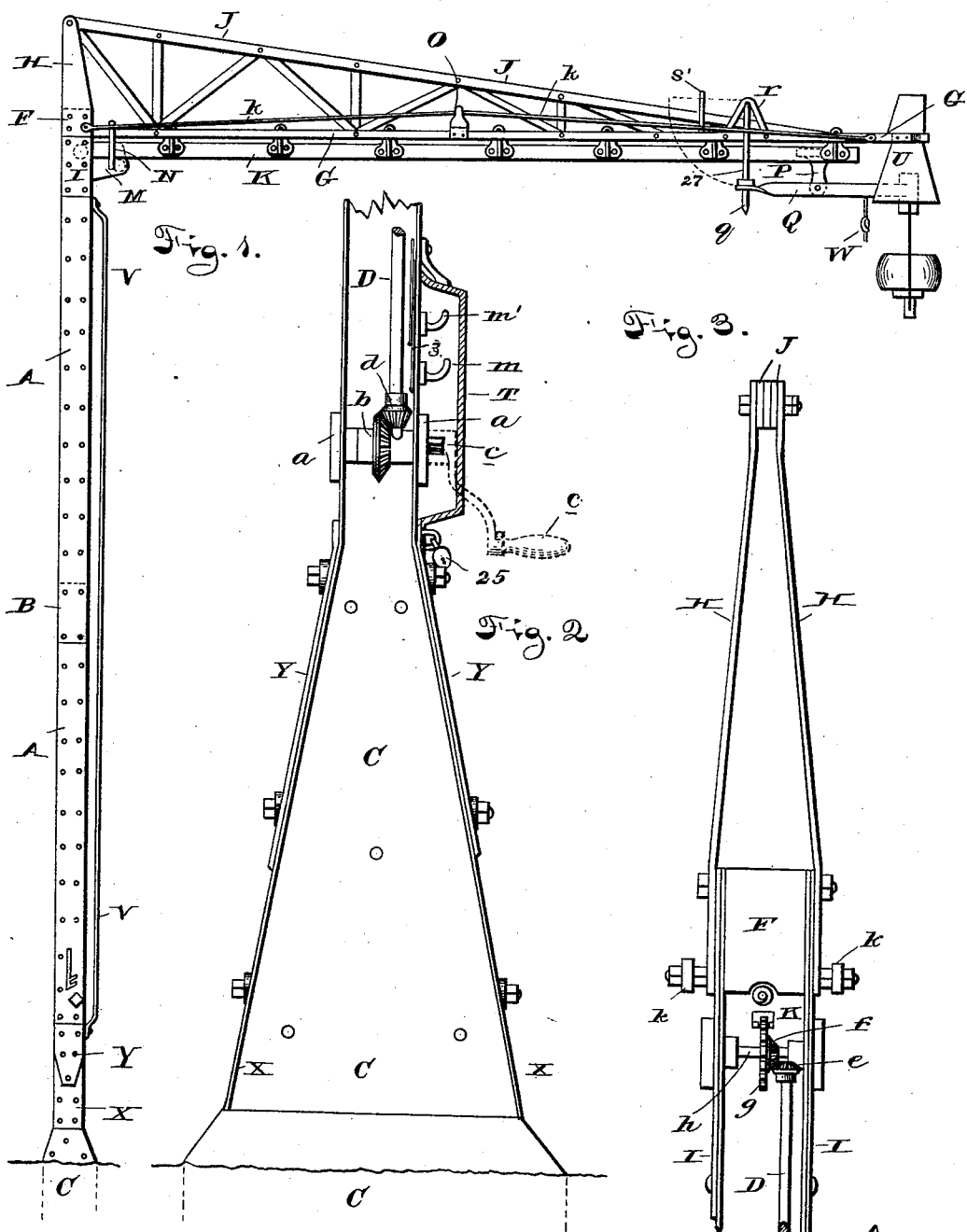

(No Model.) 4 Sheets—Sheet 3.
C. L. JEFFERS.
ELECTRIC LIGHT HANGER.
No. 428,723. Patented May 27, 1890.
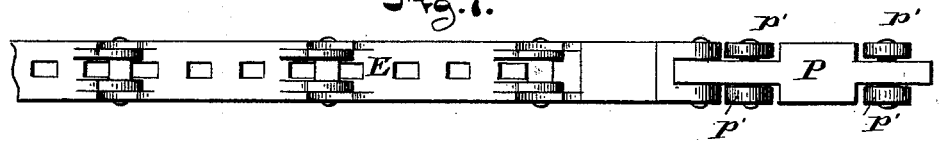
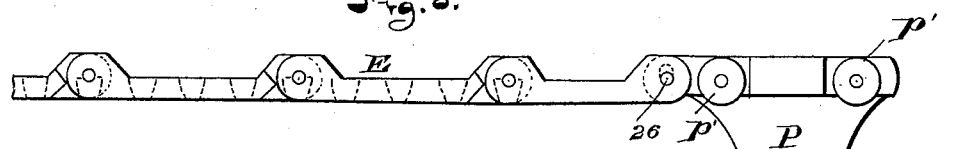
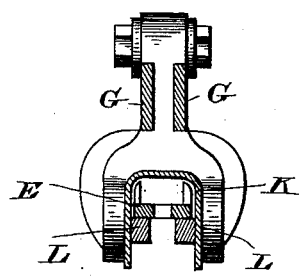 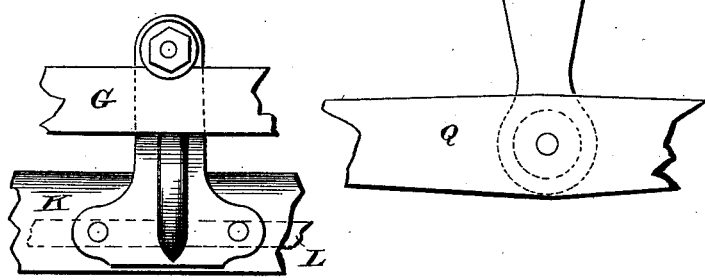
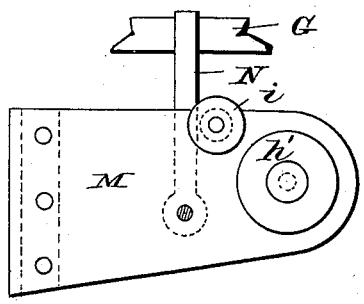 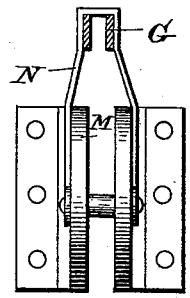
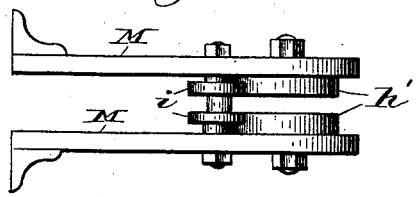
WITNESSES: INVENTOR
H. D. Nealy, Clarence L. Jeffers
T. W. Fowler BY
A. H. Evans & Co.
ATTORNEYS (No Model.) 4 Sheets—Sheet 4.
C. L. JEFFERS.
ELECTRIC LIGHT HANGER.
No. 428,723. Patented May 27, 1890.
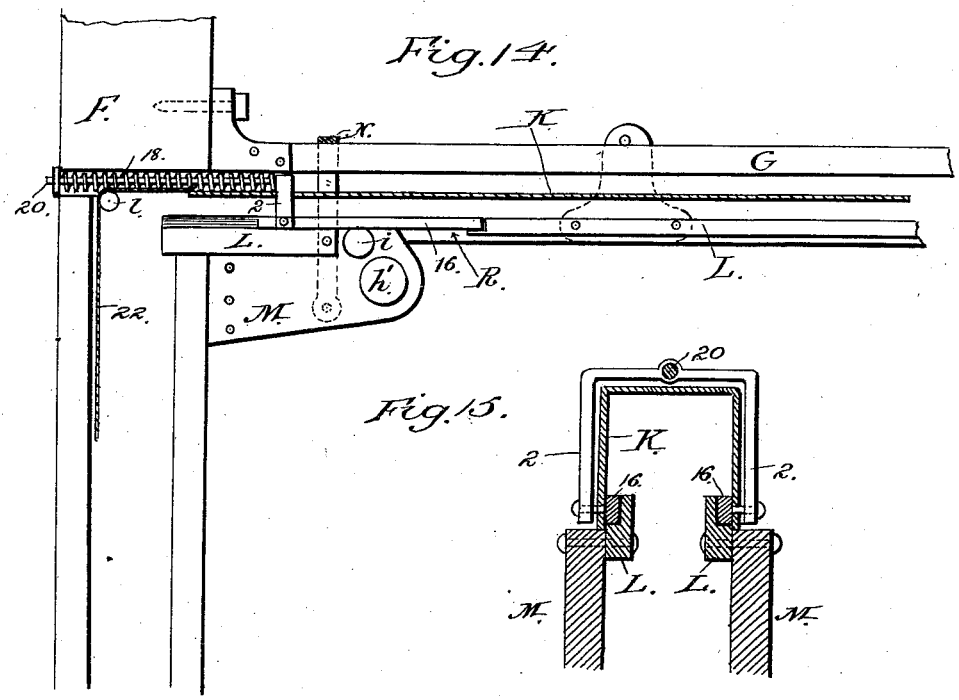
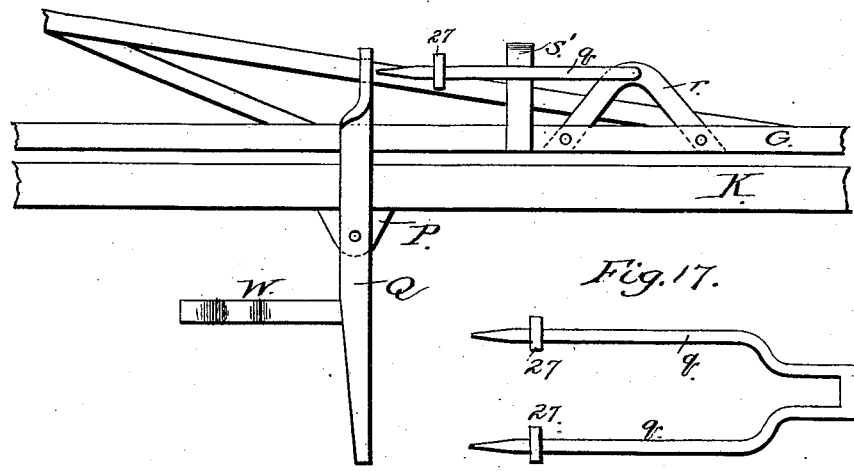
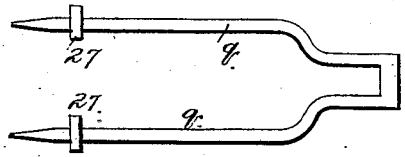
WITNESSES
T. W. Fowler
W. H. Patterson
INVENTOR
C. L. Jeffers
by A. H. Evans & Co
Attorneys

UNITED STATES PATENT OFFICE.

CLARENCE L. JEFFERS, OF MANCHESTER, NEW HAMPSHIRE.

ELECTRIC-LIGHT HANGER.

SPECIFICATION forming part of Letters Patent No. 428,723, dated May 27, 1890.

Application filed June 24, 1889. Serial No. 315,447. (No model.)

*To all whom it may concern:*

Be it known that I, CLARENCE L. JEFFERS, a citizen of the United States, residing at Manchester, in the county of Hillsborough and State of New Hampshire, have invented a new and Improved Electric-Light Hanger, of which the following is a specification.

My invention relates, first, to improvements in the construction of a mast and arm for the purpose of suspending an electric light over the center of a street or roadway, whereby great strength and durability are obtained with the least possible amount of weight, and, second, to arrangements whereby the arm is retained in a rigid horizontal position, while the lamp itself can be drawn in toward the mast and then lowered down to a convenient height to be cleaned and trimmed by the attendant, the electric current having first been cut off and disconnected from the lamp by the attendant standing on the ground at the foot of the mast.

The object of my invention is to support an electric lamp in such a manner at the outer end of a horizontal arm reaching from the top of a mast placed at the edge or curbstone of a sidewalk over and toward the center of a street that the electric current can be disconnected by the operator and the lamp drawn in toward the mast and lowered down the front of the mast to the hand of the operator, thus leaving the mast, the horizontal arm, and the wires carrying the electric current fixedly in their original position during the operation of trimming the lamp, and consequently not interfering in any manner with the occupation or use of the street.

Another object of my invention is to so construct the mast and arm that while obtaining the necessary strength, stiffness, and durability, I have at the same time avoided all unnecessary weight, and by the peculiar construction of the mast to permit of the drawing in of the lamp without occupying any more room for appliances used for such purpose than what is required for simply the mast and the lamp itself, the hood and other connections being left firmly attached to the arm.

I attain these objects by the mechanism and arrangements illustrated in the accompanying drawings, in which—

Figure 1 represents a side elevation of my improved mast and arm with outline of electric lamp in position at the farther extremity of the arm, where its rays can illumine both sides of a street. Fig. 2 is an enlarged elevation of the lower portion of the mast, looking from the sidewalk side, with a portion of one side removed, showing the connection to a solid wood post set in the ground, crossshaft and gear near bottom of mast, with crank-handle attachment, and part of vertical shaft conveying motion for operating the chain and lamp. Fig. 3 is an enlarged elevation of the upper portion of the mast, taken from the same position as Fig. 2, with rear side removed, showing the upper end of vertical shaft and gearing to operate the chain and the lamp; also showing end view of arm and its supporting-truss. Fig. 4 represents a sectional elevation of a portion of the head or upper end of the mast and of the inner end of the arm, showing gearing and part of chain and crane for holding lamp in position assumed when ready to descend on front side of mast. Fig. 5 is a plan or top view of crane to carry the electric lamp. Fig. 6 represents a twin wire spring bent in such form as to give it elasticity and adaptability to clasp around the upright guide-rod placed upon the front side of the mast, and thereby guide and steady the lamp in its descent from the head of the mast to the hand of the operator. Fig. 7 represents a plan or top view of the chain. Fig. 8 is a side elevation of the same, showing outer end or drop-link carrying fulcrum of crane. Fig. 9 is a detail showing a transverse section of the track, track-box, main frames of arm, and the connections thereto. Fig. 10 shows side elevation of the same. Figs. 11, 12, and 13 are views of a double bracket to support the track-box at its junction with the mast and to carry guiderollers for the chain, Fig. 11 being a side elevation, Fig. 12 an end view, and Fig. 13 a plan or top view, showing guide-rollers for chain. Fig. 14 is a detail showing a portion of the mast and the horizontal arm, the track and moving section thereof, and the bracket M, one side of which is removed. Fig. 15 is a detail showing in cross-section a portion of the bracket M, the track-box and track, and the spindle 20 with its side flanges or arms.

Fig. 16 is a detail showing the operation of the crane and the pivoted rod $q$. Fig. 17 is a detail of said rod.

Similar letters refer to similar parts throughout the several views.

The mast A is of hollow rectilinear form, consisting of two pieces of wood and two pieces of thin steel passing across from one piece of wood to the other and riveted through to each piece of wood, and thus forming a hollow rectilinear section of about four inches by eight inches, with a hollow space of about three and seven-eighths inches by five inches, as shown in Figs. 1, 2, and 3. For convenience this mast A may be spliced in the center of its length, as shown at B, Fig. 1, and may be made of any length required, twenty-five feet being probably the usual average height required. At its foot this mast A is attached firmly to a heavy hard-wood post C, placed to a sufficient depth in the ground, by suitable bent plates of steel, and ten or more bolts passing in both directions through both steel plates and the wood post C. The location of this post would as a general thing be in the line of the curbstone or outer edge of the sidewalk.

Near the foot of the mast or at a convenient height from the ground the steel plates will be perforated for the insertion of metal boxes $a\ a$, carrying an arbor across the mast, to which is fastened a bevel-gear $b$, and whose outer or right-hand end is made square to fit the socket of the handle $c$, carried by the attendant and applied by him when required. The bevel-gear $b$ gives motion to the bevel-pinion $d$ on the lower end of the vertical shaft D, running up near one side of the hollow space in the mast A. This vertical shaft D has at its upper end a miter-gear $e$, which engages with miter-gear $f$, and gives motion to a sprocket-wheel $g$, mounted on the cross-arbor $h$, and supported by suitable metal boxes fastened to the side plates of the mast A in a similar manner to those of the arbor carrying the gear $b$ at the lower end of the mast. By means of the above-mentioned gears and the sprocket-wheel $g$ rotary motion is conveyed from the hand of the operator to the sprocket-wheel, and thus a linear motion can be given to the chain E in either direction.

On the top of the mast A is a hard-wood block F, to which is securely fastened the inner end of the main frames G of the horizontal arm, and also on each side a tapering standard H, and all are supported and strengthened by additional plates I, attached to block F and mast A, and to both standards H H. These standards are drawn nearly together at their top ends, so as to receive between them the inner ends of the upper supporting truss-bars J J of the horizontal arm, which, with a washer between them, are firmly bolted to the standards, while the outer ends of the truss-bars J J are bolted to the main frames G of the arm, thus supporting the weight of the lamp and attachments. Below and supported by this horizontal arm is a metal box, which I term a "track-box" K, running nearly the whole distance from the mast A to the point of suspension of the lamp. To each side of this track-box K is riveted a wrought-iron bar L, forming the track, on the top of which the straight or lower side of the links forming the chain E run. The inner end of this track-box K is supported and firmly attached to the upper end of the mast A by a double bracket of iron M, (see Figs. 11, 12, and 13,) with angle-irons on each side riveted to brackets and bolted to wood sides of mast A, and this double bracket M also carries four separate rollers $h'\ h'$ and $i\ i$, Figs. 4, 11, and 13, placed so as to support and guide the chain E. This double bracket is also supported and strengthened by a bent strip of metal N, riveted to the brackets near to and below the rollers $i\ i$ and passing across over the two sides of the main frame G. These two bars of main frame, the two truss-bars J J, with the diagonal and perpendicular braces between them, (shown in Figs. 1 and 4,) constitute the framing of the horizontal arm, while it is also trussed laterally by the two rods $k\ k$, running from one of the bolts passing through the block F, standards H H, strengthening-plates I I, and side plates of mast A out over horizontal spreader of suitable length at O to outer ends of main frame G, near where the lamp is supported.

The chain E consists of a sufficient number of light-steel castings constructed with inside ears at one end and outside ears at the other end, and square perforations occurring at regular intervals and so placed in the lower or straight side of links that they shall mesh with the teeth on the periphery of the sprocket-wheel $g$, and secured together by pins or rivets passing through the inside ears of one link and the outside ears of the next link.

At the outer end of the chain is a plain or drop link P without perforations supported by four plain rollers P' running on the top of the track L and in the track-box K. This drop-link P is provided with a hub on either side at its lower end, and a pin passing through this hub supports the crane Q as a fulcrum, upon which it swings. That part of the drop-link P depending below the rollers and carrying the hub on its lower end is made sufficiently thin to pass readily between the two opposite rollers $h'\ h'$ and $i\ i$, and the drop-link is connected to the chain by the usual pin through the ears, except that the hole for that pin is made oblong or slotted, in order to prevent any friction of this joint upon the track as the bearings of the rollers may wear. (See Fig. 8 at 26.)

The track L, riveted to the track-box K, extends from near the outer end of the horizontal arm to a point at R in front of the rollers $h'\ h'$, where it is cut away for a distance of about four inches, or sufficient to permit the passage downward of the several links of the chain E, (see Fig. 4,) and inside of the rollers *i i* the track is formed of two parts, the outer part in the form of the letter L and the inner part 16 sliding on and in the angle, and being square in section. This square part of track 16 is connected on either side through a slot in the side of the track-box K to the side flanges or arms 2 of a round spindle 20, extending back through top of wood sides of mast A, through block F, and through a plate fastened on rear side of mast A at S, Fig. 4, with a spiral spring 18 to hold said small piece of track 16 in place across the opening at R, and also having a wire cord 22 attached in front of spiral spring 18, and passing over a pulley or roller *l* immediately under the spring 18 and descending in the hollow of the mast A to a plate connected with a pull or handle *m'*, which extends out through a slot in the right-hand side plate of mast A, within convenient reach of the operator. (See Fig. 2.) Another pull or handle *m* is fitted below *m'*, in and through the same slot, which is connected with a small wire which passes to the top of the mast, and thence runs outward along the arms G to the end thereof, where it is connected with any well-known form of electrically-operated switch for cutting off and turning on the current to the lamp. This construction being well known, I have not deemed it necessary to show it, as it forms no part of my invention.

The two pull-handles *m* and *m'* and the square end of the arbor, carrying the gear *b* and projecting through the side of the mast A, upon which is placed the crank-handle *c*, are all inclosed in a sheet-metal box or casing T, Fig. 2, said box or casing being slipped up under a weather strip or protection at the top and over a staple in side of mast A at the bottom, and secured by a padlock 25, and is hung by a chain in such a manner that it will swing off clear of the pulls and handle.

The lamp may be any of the usual patterns, and is attached by two or more screws to two blocks of hard wood *o o*, Fig. 5. Said blocks *o o* are attached to the ends of the crane Q upon one screw in each, enabling the lamp to swing on these screws passing through the ends of crane Q, and thus maintain a perpendicular position whether the crane Q be in a horizontal or perpendicular line. The hardwood blocks *o o* are intended to act as insulators between the lamp and crane Q.

The crane Q, Fig. 5, consists of a pair of bent side pieces hung loosely upon the ends of the pin passing through the hub upon the lower end of the last or drop link P of the chain E, and bent outward at one end, so as to embrace and carry the hard-wood blocks *o o* and the lamp, and at their other ends are twisted with a half-turn into a flat and have a slotted hole *p* in this flat part near the end. These two slotted holes *p p*, Fig. 5, engage with the pointed ends of a forked bent rod *q*, (see Fig. 17,) supported by metal standards *r*, running up from the main frames G of the horizontal arm. The action of this bent rod *q*, passing through the slots in crane Q, is to hold crane Q in the horizontal position by means of a loose collar 27, fastened by a setscrew at the proper position, and thus hold up the lamp hung at the other end of the crane Q under the fixed cone or deflector U.

When motion toward mast A is communicated to the chain E, drop-link P, and crane Q, pressure of the ends of the slots *p p* is exerted against the lower ends of the bent rod *q*, which, as this pressure and linear motion are continued, swings in its standards *r* to a horizontal position. (Indicated by the dotted arc of a circle on Fig. 1.) When this bent rod *q* has assumed the horizontal position, the crane Q, passing on steadily toward the mast A, frees itself from the bent rod *q* over the pointed ends thereof, said crane Q having then assumed a perpendicular position by reason of the force applied and the reaction of the bent rod *q*. This bent rod *q*, during its passage upward, has been forced past a side spring S', which holds it in the horizontal position until the return of crane Q, when the slots in crane Q again engage with the pointed ends of the bent rod *q*, and (the motion continuing) the crane Q is forced down into the horizontal position, and the lamp is again raised to its proper position under the hood or deflector U, and is ready to be lighted. This hood or deflector U is attached by screws to a block of wood at the top, and by the outside of this wood to the ends of the two main frames G of the horizontal arm, which are spread out to embrace the wood, and are insulated by the insertion of a strip of mica between them and the sides of the wood suspension-block.

The crane Q has also an attachment to both sides of it of a twin spring W, Figs. 5 and 6, placed near the connection to the lamp, and in such position that when brought into contact with a rod V, attached to the front side of mast A, it will clasp it and slide down said rod V to such height as required by the operator and hold the lamp steady against the action of the wind. This twin spring W, Figs. 5 and 6, is so constructed that the swing and weight of the lamp will force it to open and clasp around the rod V on striking it while descending, and on returning the strain of the chain E causes the spring W to open and release its hold upon the rod V.

Having described the various mechanical parts of my invention, I will now proceed to give in rotation the operations to be performed by the attendant when cleaning and trimming the lamp, so that the operations and uses of the different parts may be clearly understood. Upon his arrival at the foot of the mast A the operator first unlocks the padlock 25 and removes it from the staple, then removes the box T by taking it off from the staple and out from under the weatherstrip at its top and allowing it to swing, by a chain attaching it to the further side of the mast, off clear of the pull-handles $m$ and $m'$ and the end of the arbor squared for the reception of the handle $c$. Having exposed the two pull-handles and the square end of the arbor, he applies the handle $c$, (which he carries with him,) and is now prepared to operate for trimming. He now pulls down the pull-handle $m$, which by means of a small wire and any well-known form of electric switch and connections breaks the electric current from the lamp. He then turns the crank $c$ toward himself at the bottom, which causes the sprocket-wheel $g$ to revolve and draws the chain E toward the mast A. As soon as the chain E commences to move toward the mast A the bent rod $q$ is forced from its upright position by the weight of the lamp acting on the crane Q, the lamp drops down from under the hood U and very soon assumes its position, hanging at the lower end of the crane, as partly shown in Fig. 4, and at the same time and by the same motion the spring W has assumed the horizontal position of Fig. 4 and is ready to engage with the rod V when it reaches it. The operator continues to turn the crank $c$ in this same direction, drawing in the chain E, the rear end of which passes over the sprocket-wheel $g$ and guide-roller Z into and down the hollow space in the mast A until the last or drop link P has reached a point over the center of the two side rollers $i$ $i$, Fig. 4, said rollers then supporting the weight of the lamp hanging down from lower end of crane Q. The operator now holds the crank $c$ in this position and pulls down the upper pull-handle $m'$, which, by means of its wire cord 22 passing over the roller $l$, draws back the short square piece of track 16 away from the track L, fastened to the track-box K, compressing spring 18 at top of the mast A, and thus forming the opening at R and permitting the passage of the chain E through the opening R over the two rollers $h'$ $h'$ and downward in front of mast A, as shown in Fig. 4. Having drawn back the lamp to position indicated and against a stop at that point over the center of the rollers $i$ $i$, the operator now turns the crank $c$ in an opposite direction—viz, the bottom from him as he stands on the sidewalk facing the chain E, in the direction toward the center of the street, but, having drawn away the piece of sliding track 16, the chain E turns downward and becomes guided by the rollers $h'$ $h'$. (See Fig. 4.) The lamp and crane Q then begin to descend, and the twin spring W engages with the rod V and steadies the lamp in its descent to the hand of the operator, where he fastens it by taking the box T with a turn of its chain over and around the handle $c$. He then proceeds to clean the lamp and renew the carbon points in the usual manner, and then returns the lamp by reversed motions of the crank $c$ to the top of the mast A with drop-link P resting on top of rollers $i$ $i$. The operator then releases the upper pull-handle $m'$ from its side catch, when the spiral spring 18, acting on the sliding track 16, closes the open space R, so that now the chain and drop-link can be pushed out to the end of the horizontal arm. By again reversing the motion of the crank $c$ and sprocket-wheel $g$ the chain E is forced out to the end of the arm, at the same time bringing the lamp to a vertical position under the hood U. The operator then releases the lower pull-handle $m$, which allows the electric connections to open the circuit through the lamp.

The advantages of my improvements are, a rigid but light-weight mast and arm; a chain so constructed and guided that it can be used to push as well as to pull its load, and the slack of it is provided for in the hollow of the mast A, thus occupying no additional room; the maintenance of a firm rigid mast and arm, and the bringing down of the electric lamp to the hand of the operator without occupying any more room in the street than that actually used by the lamp itself, whereby all interference with street-travel is entirely avoided.

Having fully described my invention and improvements, with their advantages, objects, and methods of obtaining the same, what I desire to claim, and secure by Letters Patent, is—

1. The combination, with the mast, the horizontal arm extending therefrom, and a lamp suspended from said arm, of a track in the arm for the lamp to travel on, a carrier for moving said lamp, a sliding section in the track, and means for opening the latter to permit the lamp to drop from its track upon the arm alongside the mast.

2. The combination of the horizontal arm, a lamp, a crane suspending the lamp, a chain or carrier attached to said crane, a track-box K, secured to said arm, a track L, fastened to track-box K and provided near its inner end with a sliding portion 16 adapted to be operated from the ground, whereby the direction of motion of the crane, chain, and lamp is changed to enable the lamp to pass down the mast to the hand of the operator, substantially as described.

3. The combination, with the mast, of the main frames of the horizontal arm, the track within the arm, the lamp and a support therefor, a carrier or chain for moving the lamp along the track, the hood U, and the insulator interposed between said main frames and the hood, substantially as herein described.

4. The chain and mechanism for operating the same, consisting of the crank $c$, gears $b$ and $d$, upright shaft D, gears $e$ and $f$, and sprocket-wheel $g$, substantially as shown and described.

5. The combination of the crane having eyes or slats P, a rod pivoted in a support and provided with a collar, the drop-link of the operating-chain, and the support therefor, substantially as described.

6. The combination, with the hollow mast, its horizontal arm having a track and a lamp-supporting crane connected with said arm and the sprocket-wheel $g$, of the chain E, composed of links having outside ears at one end of each link and inside ears at the other end of each link, whereby each link can be attached by a pin or rivet to the link next preceding it, and also having perforations at regular intervals and of a size arranged and proportioned to fit onto and mesh with the teeth of the sprocket-wheel, the whole arrangement and construction enabling the chain to be pushed as well as pulled when guided by the track, said chain terminating in a drop-link P, to which is attached the crane, substantially as shown and described.

7. The combination, with the crane Q, of the twin spring W and the rod V, secured to the front side of mast A, said spring being adapted to engage with the rod V and hold the crane Q steady during its descent, substantially as shown and described.

8. The combination, with the mast A and horizontal arm, of the double bracket M, provided with double sets of rollers for the guidance of the chain, said bracket being arranged to permit the free passage of the drop-link P between the rollers, substantially as shown and described.

9. The combination of post C, mast A, horizontal arm, chain E, drop-link P, crane Q, bent rod $q$, standards $r$, twin springs W, guide-rod V, track L and sliding track 16, spring 18, and gearing, substantially as shown and described.

CLARENCE L. JEFFERS.

Witnesses:
EDWARD L. KIMBALL,
SAMUEL COOPER.